United States Patent Office 3,092,819
Patented June 4, 1963

3,092,819
APPARATUS FOR MONITORING A PHYSICAL MAGNITUDE AT A MULTIPLICITY OF DISTINCT POINTS AND IN PARTICULAR FOR DETECTING BURST SLUGS IN THE CHANNELS OF A HETEROGENEOUS NUCLEAR REACTOR
Roland Cochinal, Paris, France, assignor to Commissariat a l'Energie Atomique, Paris, France, an organization of France
Filed Mar. 31, 1960, Ser. No. 19,010
Claims priority, application France Apr. 2, 1959
5 Claims. (Cl. 340—213)

In the prior patent application filed by Etienne Picard on February 16, 1960, Ser. No. 9,051, and assigned to same assignee, there was described a method and a device for quickly detecting the rise above a critical or alarm level of a physical magnitude at any of a multiplicity of points where it is measured and for determining the variations of this magnitude at a point where the corresponding critical level has been exceeded.

The method and device according to this prior patent application was in particular applicable to the monitoring of heterogeneous nuclear reactors, in order to detect possible leaks in the cans or jackets which surround the slugs of fissionable material constituting the nuclear fuel, by signalling the rise above the alarm level of the radioactivity of the fission products (having passed through a damaged can), in any of the multiplicity of coolant gas streams having been in contact with the slugs of fissionable material, and by determining the variations of this radioactivity in a stream of coolant gas for which the corresponding alarm level (generally variable from one gaseous stream to another) has been exceeded.

When applying the method and the device according to said prior patent application to a nuclear reactor with a multiplicity of channels (for instance about one thousand) in which are housed jacketed elements or slugs of fissionable material and through which pass the coolant gas streams for said elements, there is collected, in the known manner, by means of collecting or picking up tubes, a portion of every gaseous stream at the outlet of its channel and the tubes are divided, in a manner also known in itself, into groups of N channels themselves divided into $N/n$ sub-groups each comprising $n$ tubes, the radiocativity of the N gaseous samples of a given group being determined, according to the improvements described in said prior patent application, by means of a single radioactivity detector which assumes the monitoring of N channels by successively studying the gaseous samples supplied by the respective sub-groups or the respective tubes of the group.

In particular, according to the above mentioned prior patent application, for a given group of sample collecting tubes, the sequence of the gaseous samples sent to the single radioactivity detector is controlled in accordance to three predetermined types of programs, to wit:

The first one—which corresponds to a normal monitoring—consisting in successively sending to the detector, according to a relatively long cycle, the gas samples collected in the $N/n$ sub-groups;

The second one—which comes into action as soon as the alarm level of radioactivity has been found to be exceeded for a given sub-group, so as to detect, in this sub-group, the sample collecting tube that corresponds to the channel in which there is a damaged can—consisting, on the one hand, in continuing the normal monitoring of the other sub-groups, according to a relatively long cycle, and, on the other hand, in successively sending to said detector and according to a relatively short cycle, the gaseous samples collected by each of the $n$ tubes of said given sub-group;

And the third one—which comes into action as soon as the radioactivity alarm has been found to be exceeded for a given tube of said given sub-group, so as to monitor the gases escaping from this tube in an accelerated manner—consisting, on the one hand, in continuing the normal monitoring for said given sub-group (deprived of said particular tube) and for the other sub-groups, according to a relatively long cycle, and, on the other hand, in sending, according to a relatively short cycle, to the detector, the gaseous sample collected by said particular tube.

In a general manner, the above-mentioned prior patent application disclosed and claimed a method for monitoring the variations of a physical magnitude at a multiplicity of distinct points, by means of a single instrument capable of measuring this magnitude, of a multiplicity of ways being provided for transmitting this magnitude from said respective points to said instrument and a restricted number of switch means being mounted in said ways, the group formed by said ways being divided into a plurality of sub-groups, which method comprises operating said switch means to transmit to said instrument the mean value of said magnitude for each of said sub-groups successively according to a predetermined sequence of switch means operations which is repeated cyclically, with a given period of repetition, pursuing this switch control program as long as no measurement made by said instrument exceeds a critical or alarm value, modifying this switch control program, as soon as a defect is detected in one sub-group by said instrument giving for said sub-group a measurement exceeding this critical value, by withdrawing from said sequence the operation of the switch means corresponding to this defective sub-group and intercalating into said sequence successive intercalary switch means operations each transmitting to said instrument the magnitude at one of the respective points corresponding to said defective sub-group, these intercalary switch means operations taking place cyclically according to a predetermined sub-sequence having a period shorter than said first mentioned period, thus forming a second switch control program, pursuing this second switch control program until the particular point of this defective sub-group where the defect has occurred is detected by said instrument giving for this particular point a measurement exceeding said critical value, then establishing a third switch control programe which is the first one modified, on the one hand, by the fact that the particular point where the defect has been detected is no longer included in the sub-group to which it normally belongs and, on the other hand, by intercalating, into the sequence of operations, switch means operations for periodically transmitting to said instrument the magnitude at said particular point, at time intervals shorter than said first mentioned period and repeating said third switch control program until the magnitude at said particular point reaches a danger value.

The above-mentioned prior patent application also described a device for carrying out this method, preferably comprising a digital computer capable of successively forming the coded call or address signals of the switching means (consisting of valves) to be actuated for transmitting to the measurement instrument the physical magnitude at different points, according to the successive programs.

The present invention relates to new embodiments of the method according to the above-mentioned prior patent application, which consist, in order to perform the correct succession of the switching operations according to the three types of programs, in making use chiefly of electromechanical means for materializing and performing these three types of programs and for memorizing the sub-groups and the points or tubes for which the critical level has been reached.

The invention therefore has for its object a device for quickly detecting when a physical magnitude has assumed a value exceeding the alarm level at any point, among a group including a great number N of points forming $m$ sub-groups including each $n$ points $$\left(m=\frac{N}{n}\right)$$

and for monitoring the value of said magnitude at a point where the alarm level has been exceeded, with a single threshold instrument responsive to the reaching of a predetermined alarm level or threshold value by said magnitude and a reduced number of ways and switching means, this device including in combination: at least one series of $m$ control contacts each of which, when it is actuated, controls at least one of said switching means so as to subject said instrument to the action of said magnitude for one of said $m$ sub-groups; a group of $n$ control contacts each of which, when it is actuated, controls at least one of said switching means for subjecting said instrument to the action of said magnitude for one of said $n$ points in each of said sub-groups; a particular control contact the actuation of which controls at least one of said switching means so as to subject said instrument to said magnitude for one particular point; at least one series of $m$ holding relays for memorizing a given sub-group, the choice of a relay of such a series being effected by actuation of one of the $m$ contacts of one said series of contacts; a group of $n$ holding relays for memorizing a particular point, the choice of a relay of this group being effected by actuation of one of the $n$ contacts of said group of contacts; a control member capable of operating, according to a first type of program, for cyclically actuating the $m$ contacts of one said series of contacts, according to a second type of program, for actuating according to two interlaced cycles the $m$ contacts of one said series of contacts and the $n$ contacts of said group of contacts, and, according to a third type of program, for actuating according to two interlaced cycles the $m$ contacts of one said series of contacts and said particular contact; control means capable, upon starting, of operating said control member according to the first type of program, and after the alarm level has been exceeded for a given sub-group, of feeding one said series of holding relays and of operating said control member according to the second type of program, after the alarm level has been exceeded for a particular point, of feeding said group of holding relays and of operating said control member according to the third type of program, and, under the effect of a voluntary or positive human operation, of cutting off the feed of current to the series of relays that were fed and to said group of relays and of stopping the operation of said control member according to the third type of program; and sub-group and point selector relays, made operative by said control means after the alarm level has been exceeded respectively for a given sub-group and for a particular point and selected by the holding relays respectively of one series and of said group actually chosen, arranged to withdraw respectively said given sub-group from the second type of program and said particular point from the third type of program.

Preferred embodiments of the present invention will be hereinafter described with reference to the accompanying drawings given merely by way of example and in which.

The present invention will now be described in the case of a device for monitoring a heterogeneous nuclear reactor including a graphite block provided with one thousand channels in which are housed cans containing fissionable elements or slugs (for instance elements of natural uranium) through which channels a gas under pressure (such for instance as carbon dioxide) is circulated.

A portion (for instance from 1 to 5%) of the gaseous coolant stream is collected or picked up at the outlet of every channel, by means of a tube 1. There are therefore one thousand tubes 1 which are divided into ten groups A, B, C . . . and, in each of these groups, the tubes are divided into twenty sub-groups numbered I, II, III . . . XX, each of said sub-groups including five tubes called $a$, $b$, $c$, $d$, $e$ ($N=100$, $n=5$, $m=20$).

Figure 1:
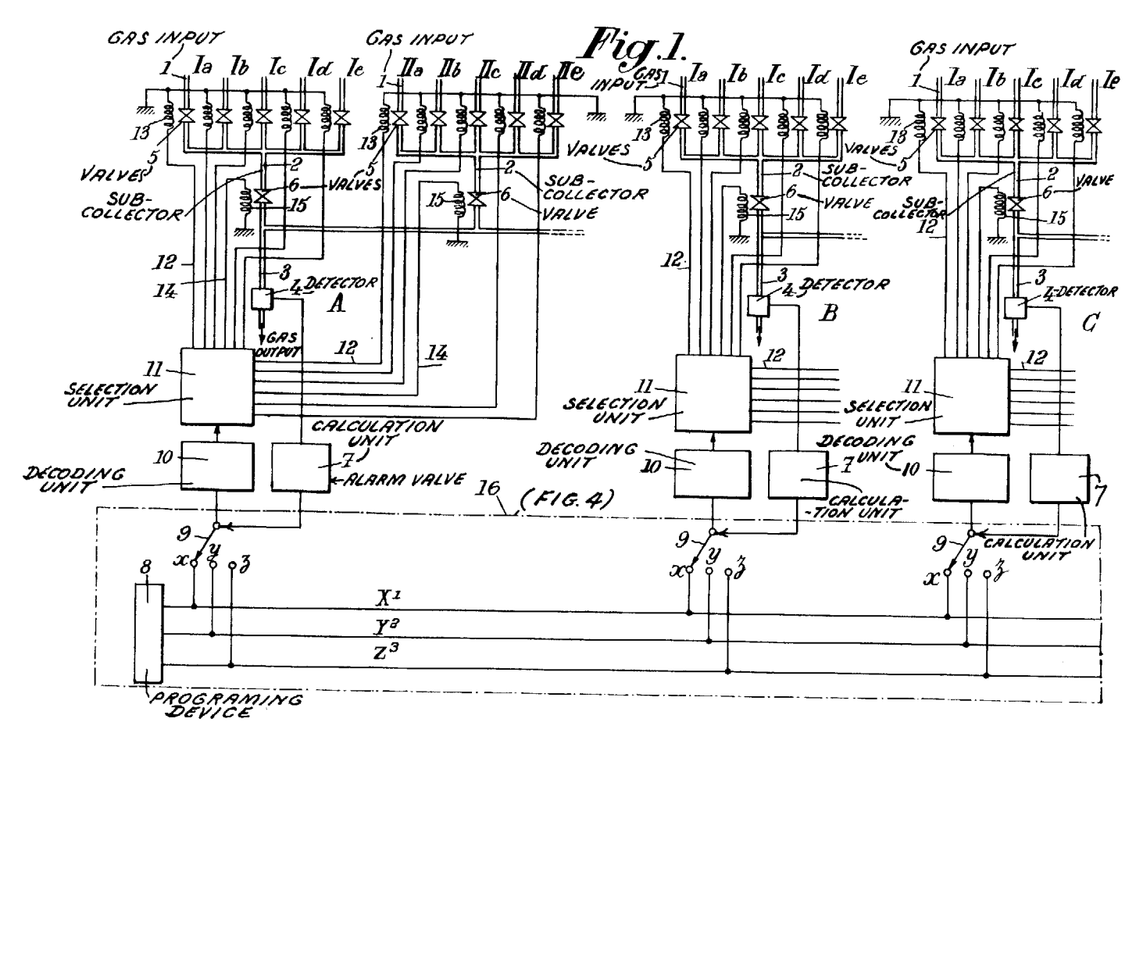
FIG. 1 illustrates, in a diagrammatic manner, an arrangement embodying the process common to the present application and to the above-mentioned prior patent application.

As in the embodiment illustrated by FIG. 2 of the above mentioned prior patent application (where the nuclear reactor of the above mentioned type is also shown, with its channels and the gaseous samples collecting tubes), the picking-up tubes 1 of a given sub-group are connected with a common sub-collector 2 and the sub-collectors of a given group are connected with a common collector 3, which passes in front of the nuclear radiation detector 4 corresponding to said group. A valve 5 is disposed near the downstream end of every tube 1 and a valve 6 is provided on every sub-collector 2 so as to make it possible to feed to the collector 3 and therefore in front of detector 4, either the mixed effluent gases from all the tubes of a given sub-group (all the valves 5 and the valve 6 of this sub-group being open), or the effluent streams from one or several tubes of a sub-group (one or several valves 5 and the valve 6 of this sub-group being open).

The case will be hereinafter considered of a single group (group A) with its detector 4 (every group comprising a single detector as above mentioned).

The output signal from detector 4 is sent to a calculation unit 7 (which may be common to all the groups) which determines whether the radioactivity measured by the detector exceeds an alarm level for the sub-group or the tube for which the measurement has been made, account being preferably taken of the possible variation of power of the nuclear reactor. A calculation unit of this type is described for instance in the Belgian Patent No. 572,142, filed by Commissariat a l'Energie Atomique.

Calculation unit 7 determines (separately for every group if it is common to all the groups) the shifting from one type of program to another. These three types of programs have been diagrammatically indicated on FIG. 1 by three lines $X^1$, $Y^2$ and $Z^3$ which correspond respectively to:

A first routine program, brought into play when the device is started, in which detector 4 measures the radioactivity for every sub-group successively, A second program, brought into play as soon as calculation unit 7 has indicated that the alarm level has been exceeded for a given sub-group, in which detector 4 determines in said last-mentioned sub-group which is the particular tube the effluent of which has given a measurement to a value above the critical value, successive measurements of the other sub-groups being still continued, and A third program, brought into play as soon as calculation unit 7 has indicated that for one particular tube the critical level has been exceeded, in which third program detector 4 measures, at regular intervals close to one another, the radioactivity of this particular tube, while continuing to measure the radioactivity for the respective sub-groups (including said above mentioned given sub-group deprived of said particular tube).

The program that is actually brought into play (synchronism between these three programs being obtained by means of a programming device 8) is chosen by a selector represented by a switch 9 the contacts $x$, $y$, $z$ of which are respectively connected to lines $X^1$, $Y^2$, $Z^3$. By means of selector 9, the program that is chosen operates the control contacts of a decoding unit 10 comprising primary relays which, on the one hand, choose the valves 5 and 6 to be actuated by secondary relays which will be hereinafter described and, on the other hand, memorize the sub-group and the tube for which the critical value has been exceeded. This decoding unit 10 operates a switch or selection unit 11, constituted by the contacts of said secondary relays actuated by said primary relays, which produce:

Through conductors 12 and windings 13, the operation of valves 5 which are electrically operated valves closed when voltage is applied thereto (because they remain normally open), and Through conductors 14 and windings 15, the operation of valves 6 which are electrically operated valves opened when voltage is applied thereto (because they are normally closed).

In order to explain the characteristics of a device according to the present invention, description will be given of a construction of a decoding unit 10 (with reference to FIG. 2), of a selecting unit 11 (with reference to FIG. 3) and also of unit 16 (with reference to FIG. 4) in which the three types of programs are established and the program to be actually used is chosen.

Figure 2:
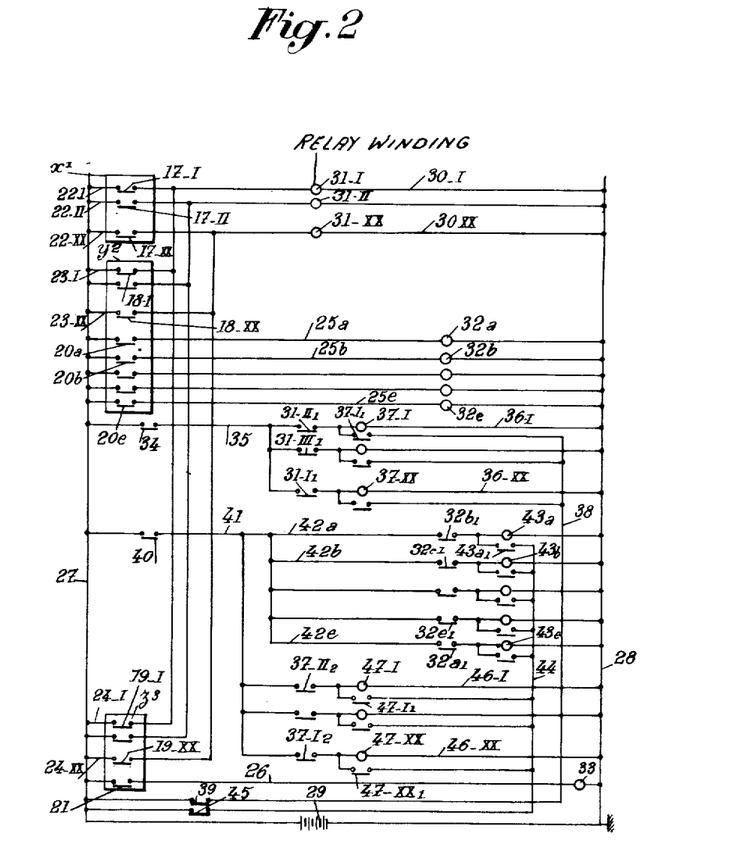
FIGS. 2 and 3 show a system of relays to be used according to a first embodiment of the present invention.

With reference first to FIG. 2 (in which only the elements corresponding to three sub-groups I, II, XX have been shown), three sets of control contacts $x^1$, $y^2$, $z^3$ have been shown, these contacts corresponding to the three above mentioned programs $X^1$, $Y^2$, $Z^3$, respectively. Closing of these contacts takes place according to three programs in a predetermined order by means of the control member shown by FIG. 4. Every set $x^1$, $y^2$, $z^3$ comprises a series of $m$ contacts, that is to say of twenty control contacts, one for each sub-group, to wit contacts 17–I, 17–II . . . 17–XX for the first program, 18–I, 18–II . . . 18–XX for the second program and 19–I, 19–II . . . 19–XX for the third program (the Roman number indicating the sub-group to which the contact corresponds). Furthermore, the second set $y^2$ comprises a group of $n$ contacts, that is to say of five contacts 20$a$, 20$b$, 20$c$, 20$d$, 20$e$ (the letter indicating the tubes of the sub-groups to which the contact corresponds), whereas the third set $z^3$ also comprises a particular contact 21.

All these control contacts 17, 18, 19, 20, 21 are make contacts disposed respectively in lines 22, 23, 24, 25 and 26 (further bearing Roman numerals or letters to indicate to what sub-group or tube they correspond) inserted between two feed lines 27 and 28 which receive current from a voltage source 29.

The lines 22, 23 and 24 corresponding to the same sub-group are connected so as to form a single line 30–I, 30–II . . . 30–XX including each a relay winding 31–I, 31–II . . . 31–XX (the contacts of which will be more explicitly described hereinafter) so that the closing of each of the contacts 17, 18 or 19 (with a Roman numeral appended thereto) controls the feed of current to the winding 31 designated by the same Roman number (the three series of contacts 17, 18 and 19 being possibly merged into one, according to a modification).

Likewise, every line 25$a$, 25$b$, 25$c$, 25$d$, 25$e$ feeds current to a relay winding 32$a$, 32$b$, 32$c$, 32$d$, 32$e$ (the contacts of which will be more explicitly referred to hereinafter) and line 26 feeds current to a winding 33.

Shifting from the first to the second type of program is performed by the closing of a contact 34 disposed in one line 35 which is branched into twenty lines 36–I, 36–II . . . 36–XX each comprising, in series, a contact 31–II$_1$, 31–III$_1$ . . . (closed by the feed of current to windings 31–II, 31–III . . . respectively) and a relay winding 37–I, 37–II . . . 37–XX which comprises a self-holding contact 37–I$_1$, 37–II$_1$ . . . 37–XX$_1$ providing a self-feeding of the winding by means of a line 38 comprising a break contact 39.

The shifting from the second to the third program is performed by the delayed opening of contact 39 and by the closing of a contact 40 provided in a line 41 which is branched into twenty-five lines, to wit:

On the one hand, five lines 42$a$, 42$b$, 42$c$, 42$d$, 42$e$ each comprising, in series, a contact 32$b_1$, 32$c_1$, 32$d_1$, 32$e_1$, 32$a_1$ (closed respectively by the feed of current to winding 32$b$, 32$c$, 32$d$, 32$e$, 32$a$) and a relay winding 43$a$, 43$b$, 43$c$, 43$d$, 43$e$ cooperating with a self-holding contact 43$a_1$, 43$b_1$, 43$c_1$, 43$d_1$, 43$e_1$, respectively, which serves to ensure the self-energizing of windings 43 through a line 44 including a switch 45, normally closed, which may be opened by a voluntary operation;

And, on the other hand, twenty lines 46–I, 46–II . . . 46–XX each comprising, in series, a contact 37–II$_2$, 37–III$_2$ . . . 37–I$_2$ (actuated by winding 37–II, 37–III . . . 37–I, respectively) and a relay winding 47–I, 47–II . . . 47–XX which cooperates with a self-holding contact 47–I$_1$, 47–II$_1$ . . . 47–XX$_1$ which keeps this relay energized through the above-mentioned line 44.

Figure 3:
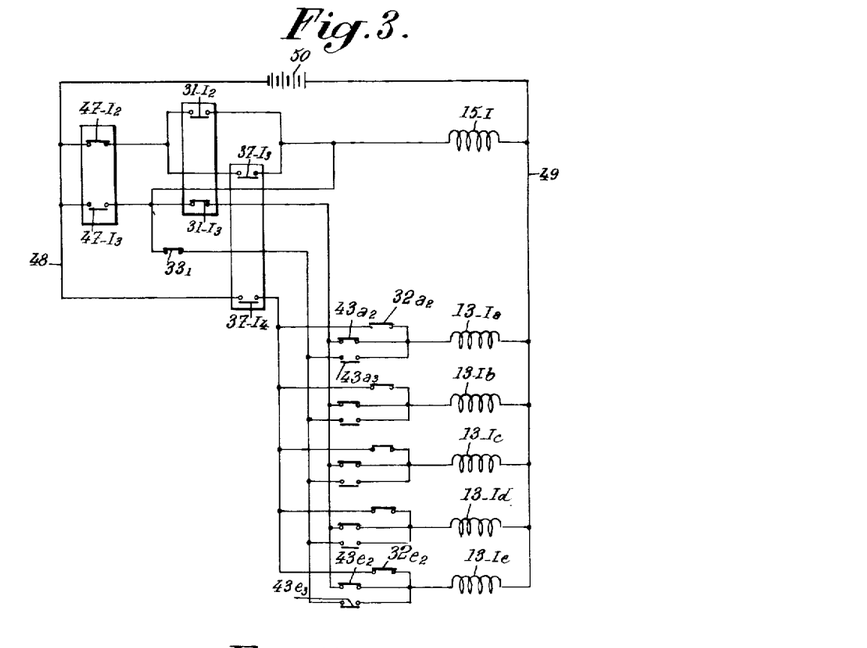

Relay windings 31, 32, 37, 43 and 47 also control other contacts in a switching unit 11 the portion of which corresponding to a single sub-group, for instance sub-group I, is shown in detail view on FIG. 3, this unit also comprising a contact operated by winding 33.

FIG. 3 shows:

The above mentioned contacts, by supplying with an index the reference of the winding that controls every contact;

The winding 15–I which controls, when it is energized, the opening of the valve 6 of the sub-group 1;

The windings 13–I$a$, 13–I$b$, 13–I$c$, 13–I$d$, 13–I$e$ each of which controls, when it is energized, the closing of the valve 5 corresponding to sub-group I;

And two feed lines 48 and 49 (which receive current from a voltage source 50) for these windings 15 and 13.

Figure 4:
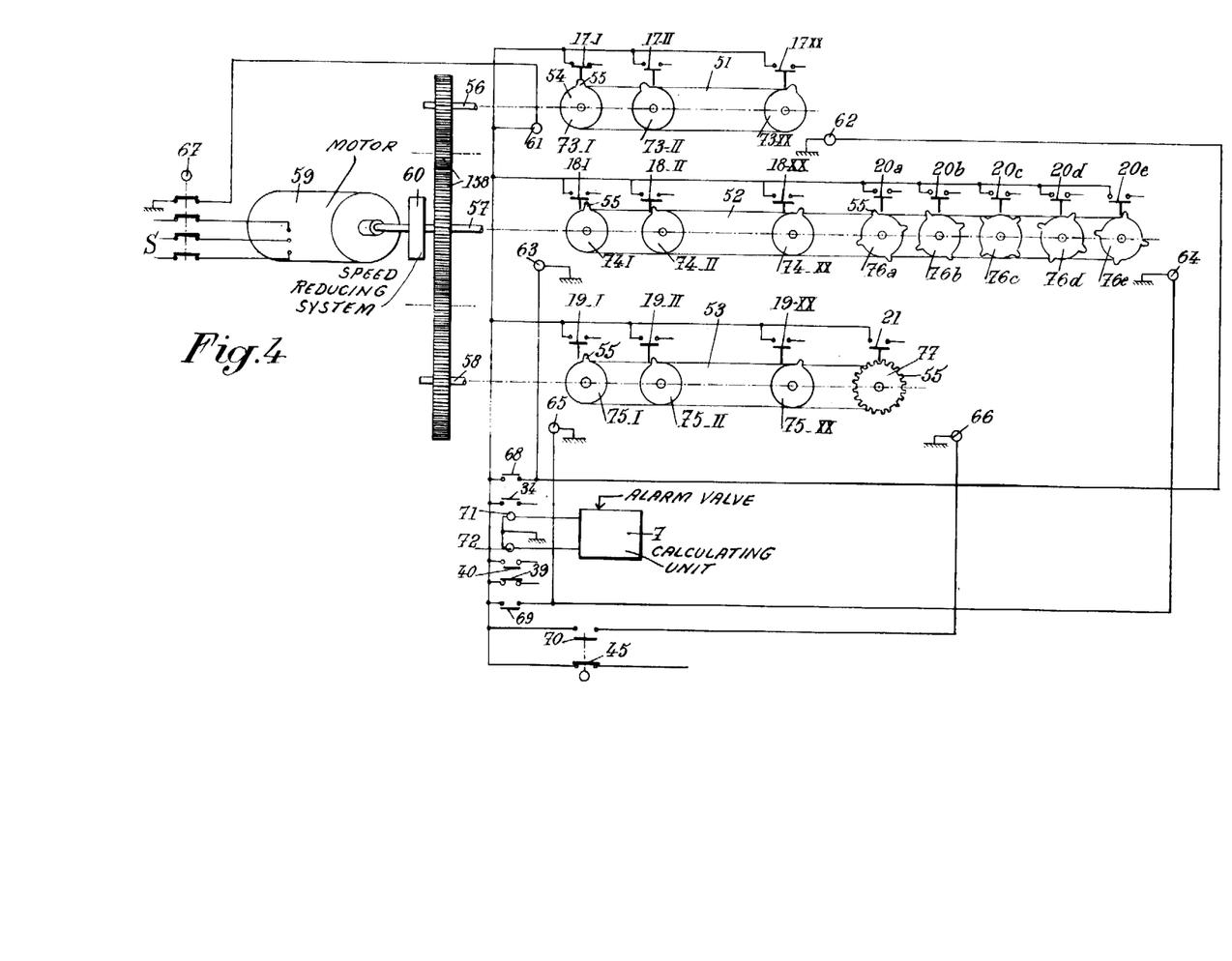
FIG. 4 shows a particular construction of the control member, with the control contacts of FIG. 2 actuated by said control member so as to embody the three types of programs, and also the control relays acting upon said member and upon other control contacts of FIG. 2.

Control of the primary contacts 17, 18, 19, 20 and 21 is effected by means of a control member, of any suitable type, for instance by means of that shown by FIG. 4.

In the construction of FIG. 4, the control member essentially comprises three cam drums 51, 52 and 53 corresponding to the first, to the second and to the third type of program, respectively. Every drum 51, 52, 53 comprises a series of discs 54 comprising one or several teeth 55 so as to constitute a cam capable of actuating a contact 17, 18, 19, 20 or 21.

Every drum 51, 52 and 53 is rotated by a shaft, respectively 56, 57 and 58 (each of these drums being however slidable axially with respect to its shaft), the three shafts 56, 57 and 58 being driven in synchronism through gears 158 from a three-phase synchronous motor 59 and a speed reducing system 60, the speed of rotation of shaft 56 being twice that of shafts 57 and 58 (for instance shaft 56 performs one revolution in twenty minutes, whereas shafts 57 and 58 perform one revolution in forty minutes).

In the non-operative position of each drum, the cams 55 thereof are not located opposite the corresponding contacts, whereas, in the operative position of each drum, the cams thereof are located opposite the contacts and can actuate them. Drum 51 is brought into operative position by energizing a relay 61 and returned into inoperative position by energizing a relay 62. Drum 52 is brought into operative position by energizing a relay 63 and returned into inoperative position by energizing a relay 64. Finally, drum 53 is placed in operative position by energizing a relay 65 and returned into inoperative position by energizing a relay 66.

Current is fed to relay 61 when the device is started, at the same time as current is fed to motor 59 through a contactor 67. The feed of current to relays 62 and 63 is effected simultaneously by the closing of contact 68. The feed of current to relays 64 and 65 is effected by the closing of contact 69 and, finally, the feed of current to relay 66 is effected by the closing of contact 70 which is closed at the same time as switch 45 is opened by a manual control for stopping the operation of the whole of the device.

Closing of contact 68 is performed at the same time as that of contact 34 by means of which shifting from the first to the second program takes place and also shown by FIG. 2, by energizing a relay winding 71 by a pulse sent by calculation unit 7 when the alarm level for a given sub-group is exceeded. Likewise, closing of contact 69 is performed, at the same time as that of contact 40, by energizing winding 72 by a pulse transmitted by calculation unit 7 when the radioactivity in a given tube exceeds the alarm level. Winding 72, when energized, further opens with some time-lag contact 39 which is also shown on FIG. 2.

Finally it will be noted that the cams constituted by a disc 54 and one or several teeth 55 mounted on shafts 56, 57 and 58 are of three different types, to wit:

Twenty cams 73–I, 73–II . . . 73–XX cooperating with contacts 17–I, 17–II . . . 17–XX, twenty cams 74–I, 74–II . . . 74–XX cooperating with contacts 18–I, 18–II . . . 18–XX and twenty cams 75–I, 75–II . . . 75–XX cooperating with contacts 19–I, 19–II . . . 19–XX which comprise a single tooth, the teeth of the twenty cams in each series (73, 74 and 75) being angularly offset from one another by 18° and the width of the teeth 55 of cams 73 being 18°, whereas the width of the teeth of cams 74 and 75 is only 9°;

Five cams 76a, 76b, 76c, 76d, 76e each including four teeth 55 cooperating with contacts 20a, 20b, 20c, 20d, 20e, respectively, the four teeth of a given cam 76 being angularly offset by 90° and having an angular width of 9° and the corresponding teeth of the two successive cams of series 76 being angularly offset by 18°; the teeth of cams 76 are angularly interlaced with the teeth of cams 74;

A cam 77 including twenty teeth 55 having an angular width of 9° and angularly offset from one another by 18°, these teeth cooperating with contact 21 and being angularly interlaced with the teeth of cams 75.

It will be noted that on each of the drums 51, 52 and 53, a tooth 55, and only one, is always in position for closing a contact and a single one, when said drum is brought into operative position. On the contrary, when the drum is in inoperative position, no contact cooperating with this drum is closed.

The operation of the device which has just been described with reference to FIGS. 1 to 4 is as follows:

Initially, switch 67 is manually closed, which causes current to be fed to motor 59 and shafts 56, 57, 58 together with drums 51, 52 and 53 to be rotated. At the same time, current is fed to winding 61, which brings drum 51 into active position, the cam 73–I of this drum first closing contact 17–I (position shown in FIG. 4). The closing of contact 17–I has for its effect (FIG. 2) to energize winding 31–I which closes its contact 31–I$_2$, which energizes winding 15–I (contact 47–I$_2$ being closed, as shown in FIG. 3).

Consequently, the valve 6 of sub-group I opens and permits the flow of the mixed effluent gases from all tubes 1 of sub-group I to be fed to detector 4 (it will be noted that all the valves 5 are open due to the fact that the windings 13 are not fed with current since contacts 47–I$_3$ and 37–I$_4$ are open).

As long as calculation unit 7 does not detect any radioactivity over the alarm level, the successive cams 73–II . . . 73–XX, 73–I, etc., of drum 51 close contacts 17–II . . . 17–XX, 17–I, etc., which has for its effect successively to open the valves 6 of the respective sub-groups, each of these openings taking place during one minute if shaft 56 makes one revolution in twenty minutes (this duration of one minute is particularly suitable for a satisfactory detection of radioactivity of the gaseous stream flowing through conduit 3 in front of detector 4).

When, due to the presence of fission products (resulting from a burst slug) in a tube 1, calculation unit 7 indicates that the alarm level is exceeded for a given sub-group comprising said particular tube, this calculation unit 7 sends a pulse which causes current to be fed to winding 71, thus closing contacts 34 and 68 (FIG. 4). The closing of contact 34 has for its effect (FIG. 2) to feed current through line 35. If it is supposed that calculation unit 7 has indicated that the radioactivity is above the alarm level for sub-group I while sub-group II is being scanned (as a matter of fact, the calculation unit can start working for a sub-group only after the radioactivity measurement for this sub-group has been terminated), winding 31–II is then energized and consequently its contact 31–II$_1$ is closed. Line 36–I then energizes winding 37–I which is then directly energized and held through its self-holding contact 37–I$_1$, thus memorizing the number of the sub-group where the radioactivity is found to be above the alarm level, by closing contacts 37–I$_3$ and 37–I$_4$ of FIG. 3. The closing of contact 37–I$_3$ keeps the valve 6 of the defective sub-group I permanently open, whereas contact 37–I$_4$ closes the five valves 5 of this sub-group by feeding current to the windings 13–Ia to 13–Ie (FIG. 3) through the five closed contacts 32$a_2$ to 32$e_2$.

The closing of contact 68 (which takes place at the same time as that of contact 34 through winding 71) has for its effect (FIG. 4) to return drum 51 into inoperative position and to bring drum 52 into operative position. Rotation of this drum has for its effect to close, on every second minute, a contact 18 for one minute and also to close, on every second minute, for one minute a contact 20, the closing of a contact 20 taking place between the closing of two contacts 18. Consequently (see FIG. 2), drum 52 alternately feeds current to a winding 31 through a line 23 and to a winding 32 through a line 25. This produces, on the one hand, the continuation of the routine scanning of the successive sub-groups, for the sub-groups where there is no burst slug (as a matter of fact, for these sub-groups the windings 37 are not energized and the contacts 37 are open) and, on the other hand, the scanning tube by tube (that is to say channel by channel for the reactor) of sub-group I where the radioactivity has exceeded the alarm level, for which winding 37–I is energized. Due to energization of this winding, contacts 37–I are closed and windings 32a to 32e are successively fed with current, which successively opens contacts 32$a_2$ to 32$e_2$ and deenergizes windings 13–Ia to 13–Ie, thus opening the valves 5 of this sub-group successively.

This program, which has for an object to determine the channel wherein a slug is burst, goes on until calculation unit 7 detects the tube for which an excess radioactivity has taken place, and sends a pulse to energize winding 72 (FIG. 4), which has for its effect to close contacts 40 and 69 and to open contact 39 with some time-lag.

The closing of contact 40 has for its effect (in a manner analogous to the closing of contact 34) to energize (FIG. 2) a winding 43 and a winding 47 so as to memorize respectively the particular tube and given sub-group for which the alarm value has been exceeded, owing to to the closing of one of the contacts 32$_1$ and of one of the contacts 37$_2$. If it is supposed that this has taken place in the first channel of the sub-group, it is winding 32b which is fed with current at the time of the closing of contact 40 (as a matter of fact, when the calculation unit 7 sends the alarm signal for a channel, it is the next channel which is then being scanned) and the closing of contact 32$b_1$ causes winding 43$a_1$ to be held excited. Likewise, the contact 37–II$_2$, closed by winding 37–I which is self-fed, causes the energizing of winding 47–I which is held excited through its contact 47–I₁. Contact 39 can then open (it is of the time-lag type) and the winding 37–I ceases to be fed through line 38.

Consequently, on FIG. 3, contact 37–I₃ opens and contact 47–I₃ closes while permanently supplying winding 15–I with current and keeping the valve 6 of sub-group I permanently open. As for the energizing of winding 43a, it has for its effect to open contact 43a₂ and to close contact 43a₃.

Finally, the closing of contact 69 (FIG. 4) by the pulse transmitted by calculation unit 7 brings the second drum 52 into inoperative position and the third drum 53 into operative position, thus causing this last mentioned drum to rotate. This rotation has for its effect:

On the one hand, by closing contacts 19 through cams 75, to continue the routine program for all the sub-groups (in a normal manner for the sub-groups other than sub-group I and only for the four tubes b, c, d, e of sub-group I); as a matter of fact, for the subgroups where no alarm has been given, the closing of contacts 19 has for its effect (FIGS. 2 and 3) to energize windings 31 which successively open valves 6, the windings 15 of which are successively fed with current through contacts such as 31–II₂, whereas their valves 5 are open; on the contrary, for sub-group I, the energization of winding 31–I opens contact 31–I₃ and permits therefore the feed of current only through closed contact 33₁ for a single winding 13–I, to wit the winding 13–Ia (for which contact 43a₃ is closed), thereby opening valves 5 of the normally fed tubes Ib, Ic, Id and Ie;

On the other hand, through cam 77, to close (FIG. 4) at regular time intervals (for instance, for the arrangement illustrated, on every second minute, between two sub-group analyzes) contact 21, which energizes winding 33 (FIG. 2) and opens the contact 33₁ (FIG. 3); the opening of contact 33₁ has for its effect to de-energize winding 13–Ia (which was fed with current only through this contact, because contacts 43a₂ and 32a₂ are open) and consequently to open the valve 5 of tube Ia.

This third type of program, which comprises the accelerated monitoring of the effluent gases from the particular tube for which the alarm limit has been exceeded, while effecting a routine monitoring of the respective sub-groups, goes on for instance until the radioactivity for this particular tube exceeds a danger level (corresponding to a radioactivity above the alarm level) which requires the unloading of the slugs contained in the reactor channel corresponding to said particular tube.

By a manual operation, it is then possible simultaneously to open contact 45 and to close contact 70 (FIGS. 2 and 4); the closing of contact 70 has for its effect to bring drum 53 into inoperative position, whereas the opening of contact 45 stops the self-holding of relays 43a and 47–I which memorized the particular tube Ia. The device of FIGS. 1 to 4 is thus brought back into its condition of rest, and a new manual operation of contactor 67 may start a new cycle of operations.

Of course, instead of controlling the closing of contacts 17, 18, 19, 20, 21 (to obtain the three successive types of programs) through a control member including three drums 51, 52 and 53, rotating at a uniform speed, it would be possible to use other control means, for instance devices rotating step by step once on every minute so as to feed, during one minute, successively (not shown) windings cooperating with contacts 17, 18, 19, 20, 21, or a three track recording (on a magnetic band or strip, a perforated strip, etc.) controlling the closing of contacts 17, 18, 19, 20 and 21 in the above mentioned order for each of the three types of programs, switch 9 choosing, under control of calculating unit 7, the suitable track X¹, Y² or Z³ read by three reading heads having their outputs connected respectively to terminals x, y and z (FIG. 1).

The number of relays might also be reduced: By providing a single series of contacts (instead of the three series 17, 18, 19 mounted in parallel and acting one after the other) for scanning sub-group by sub-group while feeding current to windings 31;

By providing a single series of holding relays (instead of two series 37 and 47 acting successively) for memorizing the number of the sub-group where the alarm level has been exceeded, in order to perform the second and third programs, this result being obtained by a slight modification of the arrangement of the contacts of FIG. 3.

Figure 5:
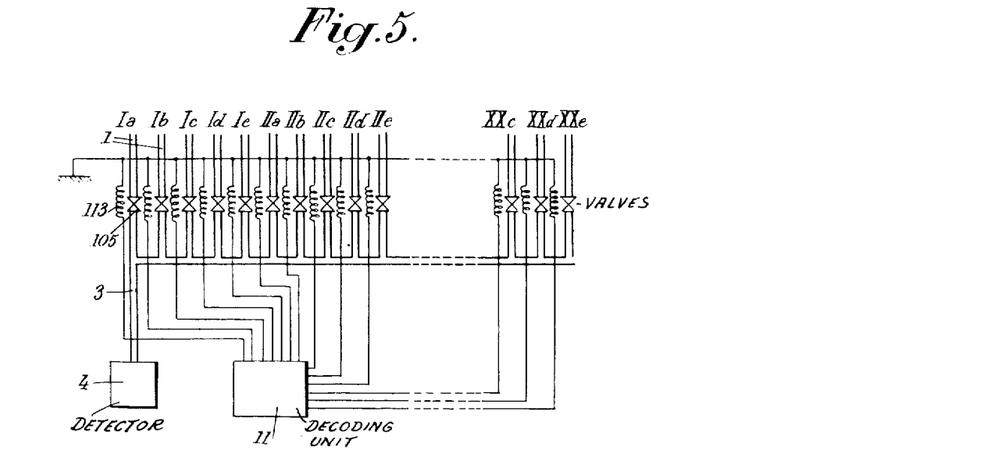
FIG. 5 shows a modification of a part of the arrangement of FIG. 1, this modification making it possible to reduce the number of valves.

Another simplification, within the scope of the present invention, consists in reducing the number of valves by eliminating valves 6 and replacing the valves 5, which are closed under the application of voltage, by valves 105 opened by the application of voltage, that is to say when current is fed to their winding 113. Such an arrangement is shown in FIG. 5 which shows a modification of a part of the arrangement according to FIG. 1, with a portion of the tubes 1 of a group leading directly to collector 3 (without sub-collectors 2).

Figure 6:
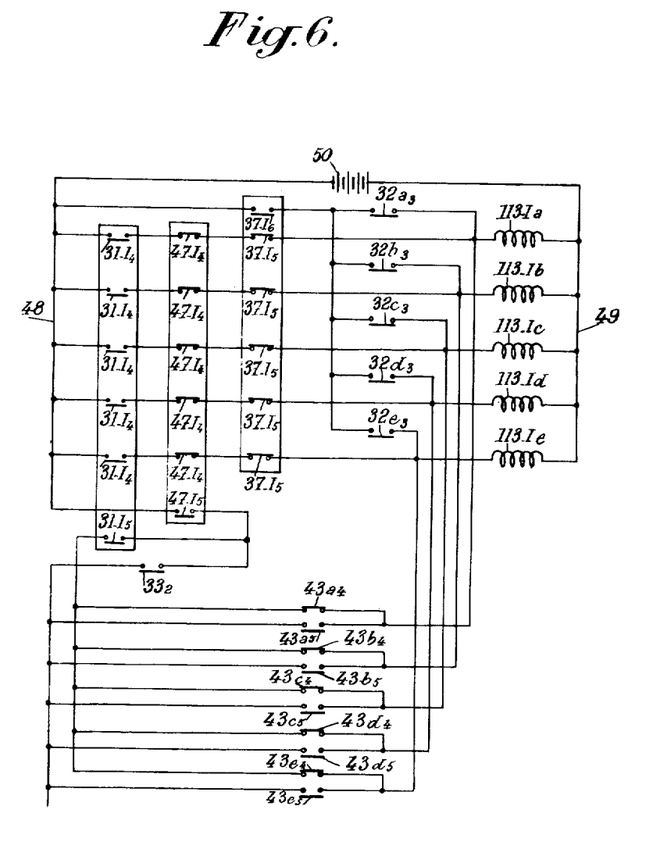
FIG. 6 shows a relay arrangement to be substituted to that of FIG. 3 for controlling the valves of FIG. 5, in combination with elements of FIGS. 2 and 4.

Control of the valves 105 may be effected (in a manner analogous to that above described) by means of a control device including three drums 51, 52, 53 acting upon contacts 17, 18, 19, 20, 21 (FIG. 4) of a unit 10 (such as shown by FIG. 2), but the windings 31, 32, 33, 37, 43 and 47, instead of acting upon the contacts of a switching unit 11 of the type shown by FIG. 3, act upon the contacts of a switching unit of the type shown in FIG. 6 for sub-group I.

This figure shows the contacts which permit to energize windings 113–Ia, 113–Ib, 113–Ic, 113–Id, 113–Ie from lines 48 and 49 fed from the voltage source 50, and these contacts have been given the same reference character as the winding of FIG. 2 that actuates them, by adding however an index.

The operation of the modification shown in FIGS. 2, 4, 5 and 6 is as follows.

For the first type of program, the coming of drum 51 (which is in operative position) into the position shown in FIG. 4 energizes winding 31–I₃ (FIG. 2) and consequently closes contacts 31–I₄. Therefore (FIG. 6), the current is fed to the five windings 113–Ia . . . 113–Ie and the valves 105 of sub-group I are opened. Rotation of drum 51 causes the successive openings of the valves of the respective sub-groups II . . . XX cyclically during one minute for each of said sub-groups. Of course, in order to avoid a sudden high requirement of power for the simultaneous opening of the five valves 105 of every sub-group, there may be provided a slight offsetting or time-lag between the openings of the five valves by providing different time-lags for the closing of the five contacts 31–I₄. Likewise, there may be provided an offsetting between the orders sent to the ten groups A, B, C . . . , for instance six seconds between every group, the time-lag between the closings of the five contacts, such as 31–I₄, being then equal to one second. In this manner, during the first program, only one valve 105 is opened at a given time, which permits of reducing the maximum intensity necessary for the control current. This feature may also be applied to the other programs by providing different time-lags for contacts 43 and might also be applied to the embodiment described with reference to FIGS. 1 to 4.

Shifting from the first to the second type of program is produced, in this modification also, by the action of calculation unit 7.

During this second program, the routine scanning takes place for the sub-groups other than the sub-group where the radioactivity has been found to exceed the alarm level (for instance sub-group I). For this last mentioned sub-group, the five contacts 37–I₅ are open, whereas the contact 36–I₆ is closed (FIG. 6) by the feed of current to winding 37 of FIG. 2. Consequently, the windings 113–Ia . . . 113–Ie of this sub-group can only be fed individually through the closing of contacts 32a₃ . . . 32e₃, which takes place cyclically by energizing windings 32a . . . 32e through rotation of drum 52 which is then in the operative position and cyclically closes contacts 20a . . . 20e (FIGS. 2 and 4).

As for the third program (shifting to this program taking place as in the first embodiment), it comprises in addition to the routine examination of the normally working sub-groups, as in the two other programs:

On the one hand, the examination of the defective sub-group (I in the case above referred to) from which the particular tube (such as tube Ia where a burst has been found) has been withdrawn by the closed contacts 47–I₅ (closed by the memorizing function of the relay winding 47–I), 31–I₅ (cyclically closed under the effect of the closing of contact 19–I, FIG. 2, through cam 75–I, FIG. 4) and, in parallel, 43b₄, 43c₄, 43d₄, 43e₄ (contact 43a₄ having been opened by the memorizing function of the relay winding 43a of FIG. 2) which feed current to windings 113–Ib, 113–Ic, 113–Id and 113–Ie so as to open the corresponding valves 105;

On the other hand, the accelerated monitoring of the particular tube, to wit tube Ia, through the closed contacts 47–I₅ (closed by the memorizing function of relay winding 47–I), 33₂ (cyclically closed under the effect of the closing of contact 21, FIG. 2, through cam 77, FIG. 4) and 43a₅ (closed by the memorizing function of the winding of relay 43 of FIG. 2) which feed current to winding 113–Ia so as to open the valve 105 of the corresponding tube.

Stopping of the third program is effected in the same manner as above described for the first embodiment of FIGS. 1 to 4.

Some analogous elements in different groups may be advantageously merged into a single one (for instance calculation unit 7).

The device according to the present invention permits of controlling the switching elements or valves by means of a reduced number of simple and rugged elements (relays and control means, for instance of the cam type or of the pre-recorded program type, in particular making use of a magnetic strip).

In a general manner, while the above description discloses what is deemed to be a practical and efficient embodiment of the invention, it should be well understood that there might be changes made in the arrangement, disposition and form of the parts without departing from the principle of the invention as comprehended within the scope of the accompanying claims.

I claim:

1. A device for quickly detecting when the value of a physical magnitude has reached a given alarm level at any point of a multiplicity constituted by N points forming m sub-groups including each n points $$\left(m=\frac{N}{n}\right)$$

and for monitoring the value of said magnitude at a point where the alarm level has been reached, with a single threshold instrument responsive to a reaching of a predetermined alarm level by the value of said magnitude, with a plurality of magnitude-conveying paths forming a single converging network starting at said points and arriving in front of said single instrument, said network being adapted to allow the transmission of the value of said magnitude from each of said points to said instrument, and with a plurality of switching means acting on said paths to effectively switch, according to the control imparted thereon, all the points of any sub-group in said multiplicity or any point in any sub-group on said instrument, this device including in combination: at least one series of m control contacts each of which, when actuated, controls at least one of said switching means so as to subject said instrument to the action of said magnitude for one of said m sub-groups; a group of n control contacts each of which, when actuated, controls at least one of said switching means for subjecting said instrument to the action of said magnitude for one of said n points in each of said sub-groups; a particular control contact which, when actuated controls at least one of said switching means so as to subject said instrument to said magnitude for one particular point; at least one series of m holding relays for memorizing a given sub-group, the choice of a relay of such a series being effected by actuation of one of the m contacts of one said series of contacts; a group of n holding relays for memorizing a particular point, the choice of a relay of this group being effected by actuation of one of the n contacts of said group of contacts; a control member capable of operation, according to a first type of program, for cyclically actuating the m contacts of one said series of contacts, according to a second type of program, for actuating according to two interlaced cycles the m contacts of one said series of contacts and the n contacts of said group of contacts, and, according to a third type of program, for actuating according to two interlaced cycles the m contacts of one said series of contacts and said particular contact; control means, said control means operating, upon starting, said control member according to the first type of program, said control means further, and after the alarm level has been reached for a given sub-group, feeding one said series of holding relays and operating said control member according to the second type of program, said control means still further, and after the alarm level has been reached for a particular point, feeding said group of holding relays and operating said control member according to the third type of program, and control means also, under the effect of a positive human operation, cutting off the feed of current to the series of relays that were fed and to said group of relays and stopping the operation of said control member according to the third type of program; and sub-group and point selector relays, made operative by said control means after the alarm level has been reached respectively for a given sub-group and for a particular point and selected by the holding relays respectively of one series and of said group actually chosen, arranged to withdraw respectively said given sub-group from the second type of program and said particular point from the third type of program.

2. A device according to claim 1 which comprises three series of m control contacts, the homologous contacts of the three series being disposed in three lines feeding in parallel a same relay winding which controls at least one of said way switching means whereby said magnitude is made to act upon said instrument for one of said m sub-groups.

3. A device according to claim 1 which comprises two series of holding relays for memorizing a given sub-group, a first alarm contact responsive to the reaching of the alarm level for a given sub-group to energize a relay of the first series and a second alarm contact responsive to the reaching of the alarm level for a particular point to energize a relay of the second series.

4. A device according to claim 2 in which said control member comprises three record reading means and a record with a first, a second and a third track, each of which produces, when read by the corresponding reading means, the cyclical operation of said control contacts according to one of the three types of programs and said control means comprising a calculation unit which sends a first signal in response to the reaching of the alarm level for a given sub-group and a second signal in response to the reaching of the alarm level for a particular point, and a switch capable of controlling said control contacts respectively from the reading device associated with said first track in the absence of the signal from the calculation unit, from the reading device associated with said second track after the transmission of said first signal, and from the reading device associated with said third track after the transmission of said second signal.

5. A device according to claim 2, characterized in that said control member comprises three cam drums arranged to rotate in synchronism, the first drum including $m$ cam teeth offset at equal angular intervals on its periphery, so as to produce the first type of program by acting on one of said first series of $m$ control contacts, the second of said drums being provided with $m$ cam teeth offset angularly on its periphery and also with at least one series of $n$ cam teeth offset angularly on its periphery and interlaced with the first mentioned cam teeth, so as to obtain the second type of program by acting respectively upon a second of said series of $m$ control contacts and upon said group of $n$ control contacts, and the third of said drums carrying, on the one hand, $m$ cam teeth offset angularly on its periphery and, on the other hand, several cam teeth offset from one another and interlaced with the above-mentioned cam teeth, so as to produce the third type of program by acting, respectively, upon the first of said series of $m$ control contacts and upon said particular contact, said control means comprising elements capable of acting, according to the type of program to be obtained, upon one of said drums for causing the cam teeth of this last mentioned drum to act upon the corresponding control contacts.

References Cited in the file of this patent

FOREIGN PATENTS 219,184   Australia _____________ Nov. 28, 1958

OTHER REFERENCES

Bowen: "Data Processing . . . Systems," Nuclear power, March 1957, pp. 91–97.